United States Patent
Ziober

(10) Patent No.: US 7,992,342 B1
(45) Date of Patent: Aug. 9, 2011

(54) BALANCED FISHING ROD SUPPORT AND LEVERAGE DEVICE

(76) Inventor: James R. Ziober, Nokomis, FL (US)

( * ) Notice: Subject to any disclaimer, the term of this patent is extended or adjusted under 35 U.S.C. 154(b) by 961 days.

(21) Appl. No.: 11/068,650

(22) Filed: Feb. 23, 2005

(51) Int. Cl.
*A01K 91/10* (2006.01)

(52) U.S. Cl. ......................................... 43/21.2

(58) Field of Classification Search .............. 43/21.2, 43/15; 248/513–540; D22/147
See application file for complete search history.

(56) References Cited

U.S. PATENT DOCUMENTS

| | | | | |
|---|---|---|---|---|
| 3,287,844 A * | 11/1966 | Hoxter | ......................... | 43/21.2 |
| 3,902,269 A * | 9/1975 | Dunlap | ......................... | 43/21.2 |
| 4,498,257 A * | 2/1985 | Jekel | ............................. | 43/23 |
| 4,763,435 A * | 8/1988 | Deering | ........................ | 43/21.2 |
| 5,033,223 A * | 7/1991 | Minter | .......................... | 43/21.2 |
| 5,120,016 A * | 6/1992 | Dysarz | ........................... | 248/539 |
| 5,473,835 A * | 12/1995 | Emett | ............................. | 43/19.2 |
| 5,560,137 A * | 10/1996 | Herring | ........................... | 43/21.2 |
| 5,685,104 A * | 11/1997 | Breazeale, Jr. | .................... | 42/94 |
| D392,019 S * | 3/1998 | Riedell | ........................ | D22/147 |
| D438,281 S * | 2/2001 | Webster | ....................... | D22/147 |
| 6,453,598 B1* | 9/2002 | Robertson | ...................... | 43/21.2 |
| 6,557,292 B1* | 5/2003 | Howard | .......................... | 43/21.2 |
| 6,719,261 B2* | 4/2004 | Wadsworth | ................... | 248/511 |

* cited by examiner

*Primary Examiner* — Kimberly Smith
(74) *Attorney, Agent, or Firm* — Kajane McManus

(57) ABSTRACT

The balanced fishing rod support and leverage device comprises an angled rod engaging portion extending upwardly from a balanced pivotable base at a centered position along the base. A free end of the rod engaging portion is adapted to receive a butt of a fishing pole therein and the base is adapted to be engaged under the feet of a user, with the rod engaging portion extending upwardly therebetween. The device is pivotable toward and away from a user to be used to leverage a fish toward the user without allowing for horizontal buckling of the rod and device.

7 Claims, 2 Drawing Sheets

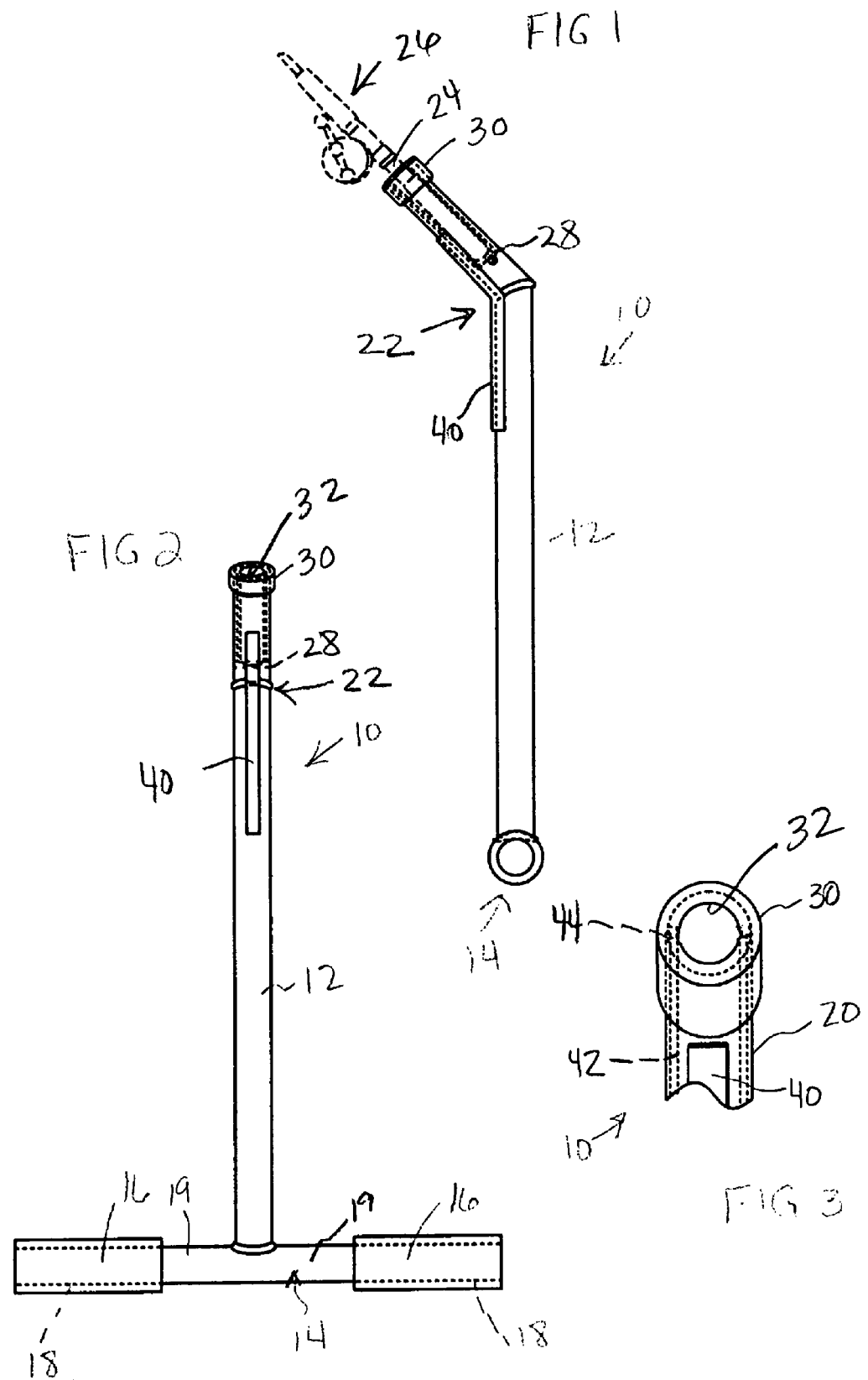

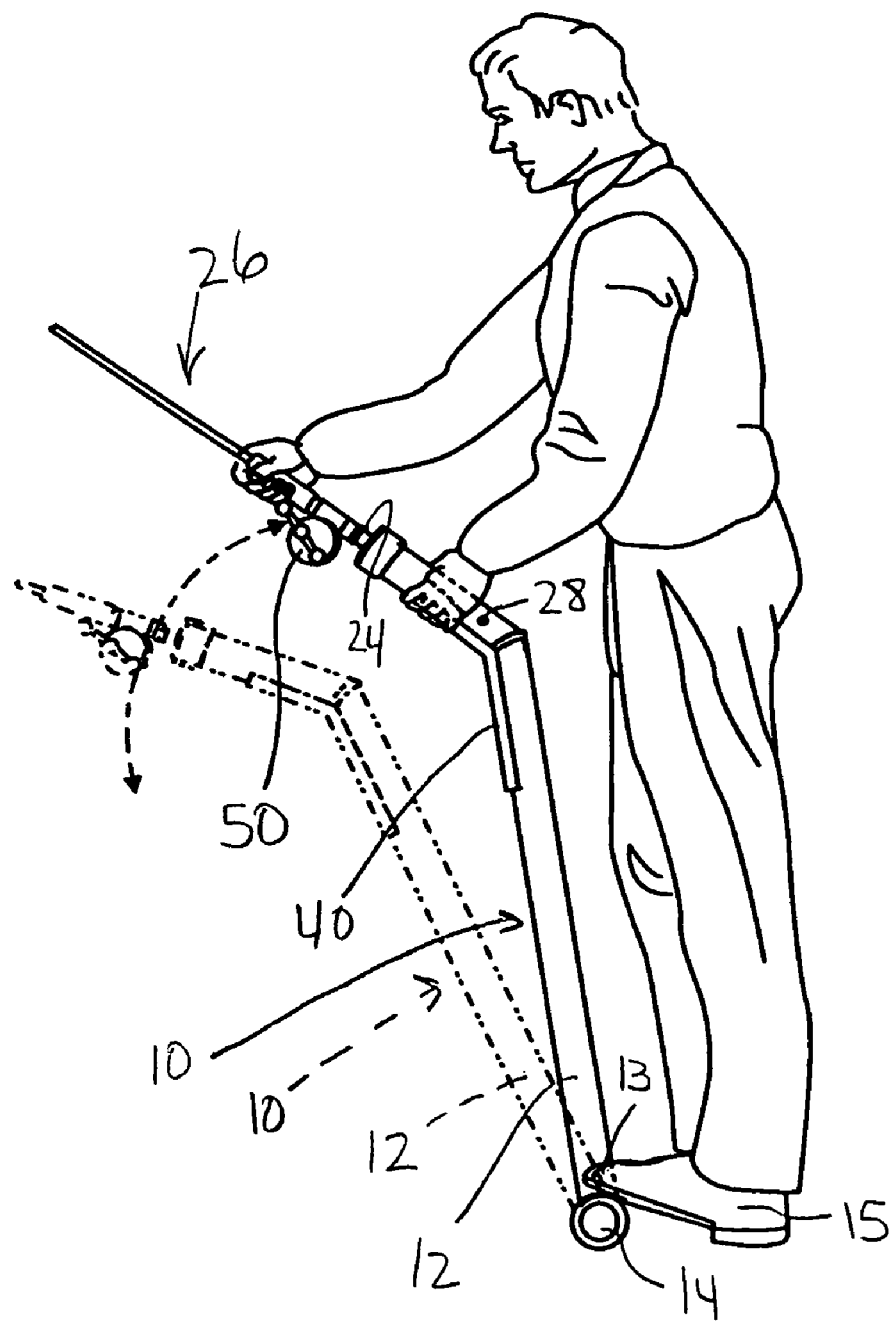

BALANCED FISHING ROD SUPPORT AND LEVERAGE DEVICE

BACKGROUND OF THE INVENTION

1. Field of the Invention

The present invention relates to a balanced fishing rod support and leverage device.

More specifically, the device includes an angled upstanding rod engaging portion which extends upwardly from a balanced base extending perpendicularly to each side of the rod engaging portion against movement upon a supporting surface therefor.

2. Prior Art

Heretofore various similar devices have been proposed. However, none have provided the balanced base, in combination with an angled upstanding rod engaging portion which may further include a gripping and/or antirub cover over a portion thereof.

SUMMARY OF THE INVENTION

According to the invention there is provided a balanced fishing rod support and leverage device comprising an angled rod engaging portion extending upwardly from a balanced pivotable base at a centered position along the base, the rod engaging portion having a free end portion adapted to receive a butt of a fishing pole therein and the base being adapted to be engaged under the feet of a user, with the rod engaging portion extending upwardly therebetween, the device being pivotable toward and away from a user to leverage a fish toward the user without allowing for horizontal buckling of the rod and device.

BRIEF DESCRIPTION OF THE DRAWINGS

FIG. 1 is a perspective side view of the device of the present invention showing a fishing rod engaged thereto in phantom.

FIG. 2 is a perspective front view of the device.

FIG. 3 is a perspective view into a rod engaging end of the device.

FIG. 4 is a perspective side view showing the device in use.

DESCRIPTION OF THE PREFERRED EMBODIMENTS

As a synopsis, the present invention provides a simple and easy to manufacture balanced fishing rod support and leverage device.

While reeling in a line, it is common for a fisherman to place the butt end of a fishing rod against his body to obtain extra leverage. Over the years, various types of devices have been proposed, such as waist belts and other padded abdominal devices. These devices all apply some degree of discomfort onto the abdomen. None move the leverage point from the person's body to the ground or deck level. Moving the leverage point also allows one to put more pressure on the line. Some devices move the leverage point from the abdomen but all of these attach a pivot point to a permanent point on a supporting surface such as a boat deck. The device of the present invention can be used anywhere one can stand while reeling in the line.

Some waist belts add drops and harnesses to add support and leverage. However these can be cumbersome and hard to put on, wasting valuable time. The most crucial moment is immediately after the fish bites, when the hook needs to be set and the fish brought under control.

Waist belts additionally, do not add any horizontal support. As pressure is increased, a rod typically wants to buckle left or right, placing added strain on the fisherman's arms. Adding a harness to the waist belt helps to remove the pressure from the arms but transfers that pressure to the back. Then drop straps need to be added to lower the waist belt to reduce strain and pressure and increase leverage. Thus, all of the weight of the rod and fish is placed on the body. The present device overcomes these problems by moving the weight from the fisherman's body to the ground or deck. The device includes a base comprising pivotable horizontal stabilizing members that the fisherman places his feet, more particularly his toes, on to provide horizontal support, stopping any tendency toward movement or buckling. It also allows the fisherman to use more of his leg muscles and less of his back muscles to retrieve the fish.

The device can rest against the boat side or pier hand rail if the fisherman's arms need a rest or if the fish overpowers the fisherman. This cannot be done with a waist belt. If a harness is used with a waist belt, the fisherman is now strapped to the rod attached to the fish. If the reel jams or the fisherman slips on a wet deck, the fish can pull the fisherman, rod, reel, harness, and belt overboard. Most fishing boat captains require that fishermen be tethered to a boat when using lines over 80 lbs. With the present device captains might require a tether be placed between the rod and boat, so that, if the reel were to jam or the fisherman lost control of the fish, and the rod were pulled overboard, it could be retrieved and not lost. However, at no time would the fisherman be at risk of being pulled overboard.

Referring now to the drawings in greater detail, there is illustrated therein the balanced fishing rod support and leverage device of the present invention and generally identified by the reference numeral 10.

As shown, the device 10 includes an angled upstanding rod engaging portion 12, extending upwardly from a base 14 which secures the device against horizontal movement or buckling upon a supporting surface (not shown) therefor by placing of the toes 13 of a user's feet 15 thereover.

It is preferable that the rod engaging portion 12 be centered along a length of the base 14, and if desired, cushioning sleeves 16 may be engaged over ends 18 of pivotable horizontal stabilizing members 19 forming the base 14, one member 19 extending to each side of the rod engaging portion 12.

As stated above, the rod engaging portion 12 is angled, as best seen in FIGS. 1 and 4. The rod engaging portion 12 extends vertically for most of the length thereof and then bends at a slight angle to one side of the base 14. The free end portion 20 of the rod engaging portion 12 beyond the point of bending at 22 accepts a butt end 24 of a fishing rod 26 therein, which extends thereinto a predetermined level, at which point the butt end 24 abuts a stop 28 within the free end portion 20, as best illustrated in FIGS. 1 and 3.

In the preferred embodiment, the stop 28 comprises a cross pin 28 extending across an inner diameter of the free end portion 20, at a position close to the point of bending at 22.

It will also be seen that the free end portion 20 incorporates an end cap 30 thereon, the end cap having an opening 32 therein which is of a smaller diameter than that of the free end portion 20.

The opening 32 provides better gripping of the butt end 24 of the rod 26 seated therethrough.

It will also be seen that the rod engaging portion 12 in the area of the bend at 22 therein, can be provided with a cushion element 40 along an inner radius of the rod engaging portion 12, relative to the bend at 22, which extends vertically to both sides of the bend at 22, along the length of the rod engaging portion 12.

This cushion element 40 acts to cushion the area of gripping of the device 10, as well as providing an antirub feature when the rod engaging portion 12 is rested against something, such as an inner wall area of a boat (not shown) or a dock structure (not shown) so no marring of the structure against which the device 10 is rested takes place.

Also, a padded sleeve 42 is provided within the free end portion 20, extending into the end cap 30, to protect the butt end 24 of the pole 26 from rubbing against a free end edge 44 of the free end portion 20 and being damaged thereby.

In use, as stated above, the most crucial moment is immediately after the fish bites, when the hook (not shown) needs to be set and the fish (not shown) brought under control. With the device 10, the fisherman only needs to stand with his rod 26 inserted into the device 10 and wait for a fish to bite, at which time he would 1) pull back on the rod 26 and/or device 10, pivoting the device 10 about the base 14 as shown in FIG. 4, and simultaneously setting the hook; 2) pivot the rod 26 and device 10 forward while at the same time taking in line by cranking the reel handle 50; 3) pull the rod 26 and device 10 against the body, pulling the fish closer, and 4) repeating steps 2 and 3 until the fish is retrieved. The added length provided by the device 10 adds more leverage, allowing larger fish to be retrieved. Also, by maintaining the weight of the user's body against the stabilizing members 19 forming the base 14, any tendency toward horizontal moving or buckling of the device 10 is substantially eliminated. Further, piviotability of the members 19 allows the user to lean back while pulling the device 10 toward the body to provide even greater degrees of leverage when necessary. The same steps can be taken by the fisherman who prefers to leave his rod in a rod holder permanently mounted to a boat or pier (not shown). The only difference is that the rod 26 would have to be removed from the holder and placed into the device 10 before setting the hook and fighting the fish with the steps defined above.

It will be understood that some fishing rods 26 have at least one cross slot in the butt end 24 thereof (not shown). If such is the case, the cross slot will accommodate the stop 28 therein, keeping the rod 26 from turning within the device 10.

As described above, the device 10 provides a number of advantages, some of which have been described above and others of which are inherent in the invention. Also, modifications to the structures disclosed herein may be proposed without departing from the teachings herein. Accordingly, the scope of the invention is only to be limited as necessitated by the accompanying claims.

The invention claimed is:

1. A balanced fishing rod support and leverage device comprising a rod engaging portion extending upwardly from a balanced pivotable base at a centered position along the base in a fixed perpendicular position relative thereto, the rod engaging portion having a free end portion angled relative thereto and adapted to receive a butt of a fishing pole therein, the free end portion having a stop member therein against which the butt end of the fishing pole rests, and the pivotable base being adapted to be engaged under the feet of a user, with the rod engaging portion extending upwardly therebetween and the angled free end portion extending away from the user, the device being pivotable toward and away from a user to leverage a fish toward the user without allowing for horizontal buckling of the rod and device.

2. The device of claim 1 wherein the free end portion includes an end cap seated thereover, the end cap having an opening therein smaller in diameter than a diameter of the free end portion.

3. The device of claim 1 wherein the free end portion includes a cushion sleeve therein extending past an end edge thereof.

4. The device of claim 1 having a cushion element extending along a section of a length of the rod engaging portion.

5. The device of claim 1 wherein the pivotable base is formed by a pivotable horizontal stabilizing member extending to each side of the rod engaging portion.

6. The device of claim 5 wherein the pivotable horizontal stabilizing member is tubular and a cushioning sleeve is engaged over opposite free ends of the horizontal stabilizing member.

7. The device of claim 1 wherein the free end portion of the rod engaging portion is angled to one side of the base in a direction away from the user.

* * * * *